United States Patent
Xu et al.

(10) Patent No.: US 8,685,901 B2
(45) Date of Patent: Apr. 1, 2014

(54) WELLBORE SERVICING COMPOSITIONS AND METHODS OF USING SAME

(75) Inventors: Ying Xu, Ponca City, OK (US); B. R. Reddy, Duncan, OK (US); Rickey Morgan, Duncan, OK (US); Lance Brothers, Chickasha, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 562 days.

(21) Appl. No.: 11/669,060

(22) Filed: Jan. 30, 2007

(65) Prior Publication Data

US 2008/0182764 A1 Jul. 31, 2008

(51) Int. Cl.
- C09K 8/74 (2006.01)
- C23F 11/18 (2006.01)
- E21B 33/13 (2006.01)

(52) U.S. Cl.
USPC .......................... 507/269; 507/271; 166/293

(58) Field of Classification Search
USPC .................................. 507/269, 271; 166/293
See application file for complete search history.

(56) References Cited

U.S. PATENT DOCUMENTS

| | | | |
|---|---|---|---|
| 3,734,188 A * | 5/1973 | Root et al. ..................... | 166/292 |
| 3,804,174 A * | 4/1974 | Chatterji et al. ............... | 166/293 |
| 4,582,139 A | 4/1986 | Childs et al. | |
| 4,662,448 A * | 5/1987 | Ashford et al. ............... | 166/290 |
| 4,676,832 A | 6/1987 | Childs et al. | |
| 4,961,786 A | 10/1990 | Novinson | |
| 5,228,914 A | 7/1993 | Miceli | |
| 5,346,012 A | 9/1994 | Heathman et al. | |
| 5,488,991 A * | 2/1996 | Cowan et al. .................. | 166/293 |
| 5,536,311 A | 7/1996 | Rodrigues et al. | |
| 5,588,488 A | 12/1996 | Vijn et al. | |
| 5,672,203 A | 9/1997 | Chatterji et al. | |
| 5,871,577 A | 2/1999 | Chatterji et al. | |
| 5,900,053 A * | 5/1999 | Brothers et al. ............... | 106/678 |
| 5,913,364 A | 6/1999 | Sweatman | |
| 6,143,069 A | 11/2000 | Brothers et al. | |
| 6,167,967 B1 | 1/2001 | Sweatman | |
| 6,227,294 B1 | 5/2001 | Chatterji et al. | |
| 6,244,343 B1 | 6/2001 | Brothers et al. | |
| 6,258,757 B1 | 7/2001 | Sweatman et al. | |
| 6,332,921 B1 | 12/2001 | Brothers et al. | |
| 6,419,016 B1 | 7/2002 | Reddy | |

(Continued)

FOREIGN PATENT DOCUMENTS

WO WO 99/33763 7/1999

OTHER PUBLICATIONS

Practical Handbook of Marine Science, Third Edition, Michael J. Kennish, CRC Press 2001.*

(Continued)

*Primary Examiner* — Aiqun Li
(74) *Attorney, Agent, or Firm* — Craig Roddy; Conley Rose, P.C.

(57) ABSTRACT

A method of servicing a wellbore in contact with a subterranean formation, comprising placing into a wellbore a composition comprising a calcium aluminate cement and a polyvalent cation-containing compound, and allowing the composition to set. A method of increasing the thickening time of a calcium aluminate cement comprising contacting the calcium aluminate cement with a polyvalent cation-containing compound. A method of adjusting the thickening time of a calcium aluminate cement comprising contacting the calcium aluminate cement with a polyvalent cation-containing compound and at least one other set modifier.

25 Claims, 1 Drawing Sheet

(56) References Cited

U.S. PATENT DOCUMENTS

| | | | |
|---|---|---|---|
| 6,488,763 | B2 | 12/2002 | Brothers et al. |
| 6,561,273 | B2 | 5/2003 | Brothers et al. |
| 6,689,208 | B1 | 2/2004 | Brothers |
| 6,796,378 | B2 | 9/2004 | Reddy et al. |
| 6,835,243 | B2 | 12/2004 | Brothers et al. |
| 6,846,357 | B2 | 1/2005 | Reddy et al. |
| 6,904,971 | B2 | 6/2005 | Brothers et al. |
| 6,908,508 | B2 | 6/2005 | Brothers |
| 6,957,702 | B2 | 10/2005 | Brothers et al. |
| 6,962,201 | B2 | 11/2005 | Brothers |
| 6,978,835 | B1 | 12/2005 | Reddy et al. |
| 7,004,256 | B1 | 2/2006 | Chatterji et al. |
| 7,021,380 | B2 | 4/2006 | Caveny et al. |
| 7,147,055 | B2 * | 12/2006 | Brothers et al. ............ 166/293 |
| 7,166,160 | B2 | 1/2007 | Reddy et al. |
| 7,337,842 | B2 | 3/2008 | Roddy et al. |
| 2004/0221991 | A1 | 11/2004 | Brothers et al. |
| 2005/0009710 | A1 * | 1/2005 | Heathman et al. ............ 507/203 |
| 2005/0120920 | A1 | 6/2005 | Brothers |
| 2005/0178296 | A1 | 8/2005 | Brothers et al. |
| 2007/0089643 | A1 | 4/2007 | Roddy et al. |

OTHER PUBLICATIONS

Sugama T.; "Hydrothermal light-weight calcium phosphate cements: Use of polyacrylnitrile-shelled hollow microspheres," Journal of Materials Science, vol. 32, Chapman & Hall, 1997, pp. 3523-3534.

Sugama T.; "Calcium aluminate cements in fly ash/calcium aluminate blend phosphate cement systems: Their role in inhibiting carbonation and acid corrosion at a low hydrothermal temperature of 90°C.," Journal of Materials Science, vol. 37, Kluwer Academic Publishers, 2002, pp. 3163-3173.

CL-23 Crosslinking Agent, HO2035, Halliburton Communications 1999.

Fe-2 Iron Sequestering Agent, HO1304, Halliburton Communications 1998.

Flexplug OBM Lost-Circulation Material, HO1494, Halliburton Communications, Oct. 2005.

Flexplug W Lost-Circulation Material, HO1494, Halliburton Communications, Oct. 2005.

FlexPlug Service Stop Lost Circulation, Hold Your Bottom Line, HO0767, Halliburton Communications, Apr. 1998.

HR-25 Cement Retarder, HO1479, Halliburton Communications 1999.

ThermaLock Cement for Corrosive Co. 2 Environments, HO1458, Halliburton Communicatons Apr. 2006.

Cementing, by Dwight K. Smith, Society of Petroleum Engineers Inc., Revised Edition Second Printing 1990.

Sugama, T., "Citric acid as a set retarder for calcium aluminate phosphate cements", Advances in Cement Research, Apr. 206, pp. 47-57, vol. 18, Issue No. 2, Thomas Telford, Ltd.

* cited by examiner

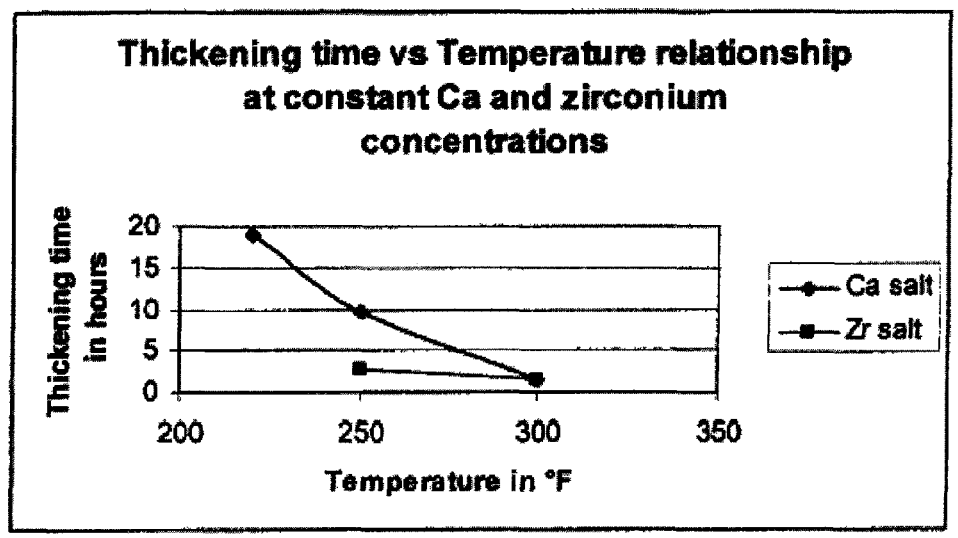

WELLBORE SERVICING COMPOSITIONS AND METHODS OF USING SAME

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This disclosure relates to servicing a wellbore. More specifically, it relates to servicing a wellbore with sealant compositions comprising a calcium aluminate cement and a set modifier and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

For cementing high temperature wells, for example steam injection wells or steam production wells, calcium aluminate cements (CACs) are typically used. In such wells, the higher temperature resistance of calcium alumina cements compared to Portland Cement/silica mixtures is an advantage for long term integrity of the cement sheath. Additionally, for cementing high temperature wells, especially those containing carbon dioxide, for example geothermal wells or carbon dioxide injection wells, calcium aluminate cements (CACs) are typically employed because the use of conventional hydraulic cement compositions may result in well failure. At high static subterranean temperatures, and in the presence of brines containing carbon dioxide, conventional hydraulic cements rapidly deteriorate due to alkali carbonation. CACs combined with a soluble phosphate salt, for example sodium metaphosphate and a filler such as Class F flyash, are commonly used in primary and secondary high temperature cementing operations to form quick setting, strong cement that upon setting binds well to the subterranean formation and to itself, resists carbonation, has high strength, and low permeability. These compositions are described in Journal of Material Science, 32, 3523-3534 (1997) and J. Material Science, 37, 3163-3173 by Sugama et al, and in U.S. Pat. Nos. 5,900,053, 6,143,069 and 6,332,921 issued to the assignee of the current invention, each of which is incorporated by reference herein in its entirety. One drawback to the use of CACs at higher temperatures is that the cementitious compositions set very rapidly, e.g., within a few minutes at elevated temperatures. The rate of reaction further increases as the temperature increases. As such, the thickening times of the compositions may be unacceptably short to allow them to be pumped to their desired downhole locations, making the use of such compositions in well cementing a challenge. For example, the drill pipe or the tool used to lower the piping in the wellbore may be cemented in place, causing delay in the completion of the wellbore.

One method commonly employed to lengthen the thickening time of CAC compositions is to introduce set retarders into the compositions, thereby delaying the time to setting of the cement. As a result, the thickening time of the CACs may endure for hours when used in a wellbore having a relatively high bottom hole static temperature. Organic acids such as citric acid or tartaric acid are examples of typical set retarders that may be used with the CAC. While these organic acids may allow the cementitious composition to remain pumpable for an extended time period these acids are costly additives and negatively impact the overall economics. A need therefore exists for inexpensive materials that increase the thickening time of CAC compositions when they are exposed to relatively high downhole temperatures and pressures.

SUMMARY OF THE PREFERRED EMBODIMENTS

Disclosed herein is a method of servicing a wellbore in contact with a subterranean formation, comprising placing into a wellbore a composition comprising a calcium aluminate cement and a polyvalent cation-containing compound, and allowing the composition to set.

Also disclosed herein is a method of increasing the thickening time of a calcium aluminate cement comprising contacting the calcium aluminate cement with a polyvalent cation-containing compound.

Further disclosed herein is a method of adjusting the thickening time of a calcium aluminate cement comprising contacting the calcium aluminate cement with a polyvalent cation-containing compound and at least one other set modifier.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a detailed description of the preferred embodiments of the disclosure, reference will now be made to the accompanying drawings in which:

FIG. 1 is a plot of the thickening time as a function of temperature for the samples from Example 3.

DETAILED DESCRIPTION OF THE PREFERRED EMBODIMENTS

Disclosed herein are wellbore servicing compositions comprising a cementitious material, and a set modifier. In an embodiment, said wellbore servicing compositions comprise a non-Portland cement and a set modifier. In another embodiment, the wellbore servicing compositions comprise a calcium aluminate cement and a set modifier. In another embodiment, the wellbore service composition comprises calcium aluminate cement comprising a blend of calcium aluminate and a phosphate salt; and a set modifier. In another embodiment, the wellbore composition comprises a calcium aluminate cement comprising a blend of calcium aluminate, a phosphate salt and flyash; and a set modifier. Each of the components of the wellbore servicing composition will be described in more detail later herein. As used herein, a "wellbore servicing composition" refers to a fluid used to drill, complete, work over, repair, or in any way prepare a wellbore for the recovery of materials residing in a subterranean formation penetrated by the wellbore. Examples of wellbore servicing compositions include, but are not limited to cement slurries, lost circulation pills, settable fluids, plugging compositions for plug-and-abandon purposes, chemical packers, temporary plugs, spacer fluids, completion fluids, or remedial fluids all of which are well known in the art.

In an embodiment, the wellbore servicing composition comprises a cementitious material which when mixed in an aqueous fluid may have a pH in the range of from about 3 to about 10. In an embodiment, the wellbore servicing composition comprises a calcium aluminate cement (CAC), which comprises calcium, aluminum, and oxygen, and sets and hardens by reaction with water. Herein a CAC refers to a cement having from about 35% to about 80% by weight of calcium aluminate. Such cements may further comprise small amounts of iron oxides and silica. In some embodiments the CAC comprises a phosphate salt. In an embodiment, the phosphate salts are polymeric phosphate salts of alkali metal salts, for example and without limitation sodium metaphosphate. In some embodiments, the CAC further comprises a flyash filler. In such embodiments, the flyash may comprise ASTM Class F flyash. Such CAC compositions comprising calcium aluminate, phosphate salt and flyash are described in U.S. Pat. Nos. 5,900,053, 6,143,069 and 6,332,921 each of which are incorporated by reference herein in its entirety. Examples of suitable CAC materials include without limitation SECAR 41, SECAR 60, SECAR 51 and SECAR 71 which are calcium aluminate hydraulic cements commercially available from Lafarge Aluminates, Cheasapeake, Va.; CA-14, CA-270, and CA-25 grade calcium aluminate cements commercially available from Almatis, Inc., Leetsdale, Pa.; and THERMALOCK cement which is a blend of calcium aluminate cement comprising calcium aluminate, a phosphate salt and flyash commercially available from Halliburton Energy Services. The set retarders to be disclosed herein are less effective and may have the opposite effect when used in combination with Portland cements (e.g., Class A, C, G and H cements), and thus the cementitious material preferably excludes such Portland cements.

In an embodiment, the wellbore servicing composition comprises a set modifier. Set modifiers are materials such as set retarders and set accelerators which function to alter the time required for the composition to undergo the phase transition from a slurry to a set mass with appreciable compressive strength. Such materials may allow the operator to control the set time of the composition based on the geothermal temperature at which the wellbore servicing composition will be used. In an embodiment, a set modifier suitable for use with the CAC comprises a polyvalent cation-containing compound. The polyvalent cation-containing compound may function to increase the thickening time of the CAC and as such act as a set retarder. In an embodiment, the polyvalent cation-containing compound comprises a salt containing a polyvalent cationic metal. Such polyvalent cationic metal containing salts are known to one of ordinary skill in the art and include for example and without limitation alkaline earth metal salts such as magnesium chloride, calcium nitrate, calcium chloride; transition metal salts such as titanium (IV) sulfate, titanium (IV) tartarate, zirconium (IV) chloride, zirconium (IV) oxychloride, zirconium (IV) acetate, zirconium (IV) citrate, zirconium (IV) latate, cobalt (II or III) chloride and, nickel (II) chloride; or combinations thereof. Examples of polyvalent metal salts suitable for use in this disclosure include without limitation calcium chloride which is widely commercially available, CL-23 which is an aqueous zirconium salt solution commercially available from Halliburton Energy Services or combinations thereof. In an embodiment, the set modifier may be included in the wellbore servicing composition in amounts ranging from about 0.1 wt. % to about 10 wt. %, alternatively from about 0.3 wt. % to about 5.0 wt. % alternatively from about 0.4 wt. % to about 2.0 wt. % based on the weight of the calcium aluminate content of the CAC.

In an embodiment, the polyvalent cation-containing compound may be used in combination with at least one other set modifier. The set modifier may comprise conventional set accelerators and set retarders which may be combined with the polyvalent cation-containing compound to provide a desired set time for a CAC. Such compositions comprising at least one polyvalent cation-containing compound with conventional set retarders and/or accelerators are referred to herein as set modifier compositions (SMC). In an embodiment, a SMC comprises a monovalent cation-containing compound and a polyvalent cation-containing compound. In an embodiment, the monovalent cation-containing compound comprises a monovalent metal salt. Monovalent metal salts are well known set accelerators for both CACs and Portland cements. Examples of monovalent metal salts suitable for use in the SMC include without limitation alkali metal salts such as the soluble salts of sodium, potassium and lithium. In an alternative embodiment, the SMC comprises a polyvalent cation-containing compound and an organic acid. Organic acids may act as set retarders that function to delay gelation of the wellbore servicing composition. Various organic acids can be included in the SMC including, but not limited to, tartaric acid, citric acid, oxalic acid, gluconic acid, oleic acid, and uric acid. Examples of suitable organic acids are commercially available from Halliburton Energy Services, Inc., of Duncan, Okla., under the trade names HR®-25 and Fe-2®. The ratio of polyvalent cation-containing compound to monovalent cation-containing compound or polyvalent cation-containing compound to organic acid in the SMC will depend on factors such as the desired set time and operating temperature and may be determined by one of ordinary skill in the art to meet the needs of the user.

The wellbore servicing composition may include a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement. The amount of water may depend on the desired density of the cement slurry and the desired slurry rheology and as such may be determined by one of ordinary skill in the art.

In some embodiments, additives may be included in the wellbore servicing composition for improving or changing the properties thereof. Examples of such additives include but are not limited to, defoamers, foaming surfactants, fluid loss agents, weighting materials, latex emulsions, dispersants, vitrified shale and other fillers such as flyashes, silica flour, sand and slag, formation conditioning agents, hollow glass or ceramic beads or combinations thereof. Other mechanical property modifying additives, for example, carbon fibers, glass fibers, metal fibers, minerals fibers, and the like can be added to further modify the mechanical properties. These additives may be included singularly or in combination. Methods for introducing these additives and their effective amounts are known to one of ordinary skill in the art. In some embodiments the compositions may be foamed using an inert gas such as nitrogen. Foamed calcium aluminate cement compositions are described in U.S. Pat. Nos. 6,332,921; 5,900,053 and 6,143,069 each of which are incorporated by reference herein in its entirety.

The components of the wellbore servicing composition comprising a set modifier may be combined in any order desired by the user to form a slurry that may then be placed into a wellbore. The components of the wellbore servicing composition comprising a set modifier may be combined using any mixing device compatible with the composition, for example a bulk mixer or a recirculating mixer. In an embodiment, the set modifier is available in an aqueous solution and is thus combined with the water before it is mixed with the remaining components of the wellbore servicing composition to form a pumpable slurry. In an alternative embodiment, the set modifier is available as solid particles and is thus combined with the other solid particles of the wellbore servicing composition before water is introduced to the composition.

The wellbore servicing compositions comprising a set modifier may be further characterized by a longer thickening time that allows the composition to remain pumpable during downhole placement before rapidly setting when compared to an otherwise identical composition lacking a set modifier. The thickening time refers to the time required for the composition to achieve 70 Bearden units of Consistency (Bc). At about 70 Bc, the slurry undergoes a conversion from a pumpable fluid state to a non-pumpable paste. In an embodiment, the wellbore servicing composition comprising a set modifier may have a thickening time of greater than about 1 hour, alternatively greater than about 5 hours, alternatively greater than about 10 hours, alternatively greater than about 15 hours, alternatively greater than about 20 hours at temperatures of from about 50° F. to about 350° F., alternatively from about 120° F. to about 300° F., alternatively greater than about 200° F.

In an embodiment the wellbore servicing composition comprising a calcium aluminate cement and a set modifier sets into a hard mass with compressive strengths of from about 250 psi to about 20000 psi, alternatively from about 500 to about 5000, alternatively from about 1000 to about 3000 psi. Herein the compressive strength is defined as the capacity of a material to withstand axially directed pushing forces. The maximum resistance of a material to an axial force is determined in accordance with American Petroleum Institute (API) Recommended Practice 10B, 22$^{rd}$ Edition, December 1997. Beyond the limit of the compressive strength, the material becomes irreversibly deformed and no longer provides structural support and/or zonal isolation.

The set modifiers of this disclosure may serve as cost effective additives which may be used to adjust the thickening time and setting of a CAC at high temperatures.

The wellbore servicing compositions comprising a set modifier can be used for any purpose. In an embodiment, the wellbore servicing composition comprising a set modifier is used to service a wellbore that penetrates a subterranean formation. It is to be understood that "subterranean formation" encompasses both areas below exposed earth and areas below earth covered by water such as ocean or fresh water. Servicing a wellbore includes, without limitation, positioning the wellbore servicing composition comprising a set modifier in the wellbore to isolate the subterranean formation from a portion of the wellbore; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; a temporary plug to divert treatment fluids; as a chemical packer to be used as a fluid in front of cement slurry in cementing operations; and to seal an annulus between the wellbore and an expandable pipe or pipe string. For instance, the wellbore servicing composition comprising a set modifier may viscosity in a loss-circulation zone and thereby restore circulation. The viscosified mixture can set into a flexible, resilient and tough material, which may prevent further fluid losses when circulation is resumed. The wellbore servicing composition comprising a set modifier may withstand substantial amounts of pressure, e.g., the hydrostatic pressure of a drilling fluid or cement slurry, without being dislodged or extruded. The wellbore servicing composition comprising a set modifier may provide a relatively viscous mass inside the loss-circulation zone. The wellbore servicing composition comprising a set modifier can also form a non-flowing, intact mass inside the loss-circulation zone. This mass plugs the zone and inhibits loss of subsequently pumped drilling fluid, which allows for further drilling.

In an embodiment, the wellbore servicing composition comprising a set modifier is placed into a wellbore as a single stream and activated by downhole conditions to form a barrier that substantially seals loss circulation zones. In another embodiment, the wellbore servicing composition comprising a set modifier may be constituted downhole as a two stream combination. In such a process, the components of the wellbore servicing composition may be injected in aqueous or nonaqueous or combination fluids. In an embodiment, the set modifier is present in the aqueous stream. The CAC may be introduced into the wellbore in a nonaqueous fluid and caused to mix with the aqueous fluid containing the set modifier. For example, the calcium aluminate may be suspended in a nonaqueous fluid and pumped down the drill pipe or casing and allowed to contact an aqueous stream containing the set modifier pumped down the annulus. Alternatively, the nonaqueous stream containing the calcium aluminate may be pumped down the annulus, and the set modifier containing aqueous stream pumped down the drill pipe or casing. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the wellbore servicing compositions comprising a set modifier may be employed in well completion operations such as primary and secondary cementing operations. Said compositions may be placed into an annulus of the wellbore and allowed to set such that it isolates the subterranean formation from a different portion of the wellbore. The wellbore servicing compositions comprising a set modifier thus form a barrier that prevents fluids in that subterranean formation from migrating into other subterranean formations. Within the annulus, the fluid also serves to support a conduit, e.g., casing, in the wellbore.

In an embodiment, the wellbore in which the wellbore servicing compositions comprising a set modifier is positioned belongs to a multilateral wellbore configuration. It is to be understood that a multilateral wellbore configuration includes at least two principal wellbores connected by one or more ancillary wellbores. In secondary cementing, often referred to as squeeze cementing, the wellbore wellbore servicing composition comprising a set modifier may be strategically positioned in the wellbore to plug a void or crack in the conduit, to plug a void or crack in the hardened sealant (e.g., cement sheath) residing in the annulus, to plug a relatively small opening known as a microannulus between the hardened sealant and the conduit, and so forth, thus acting as a sealant composition. Various procedures that may be followed to use a wellbore servicing composition in a wellbore are described in U.S. Pat. Nos. 5,346,012 and 5,588,488, which are incorporated by reference herein in their entirety.

EXAMPLES

The invention having been generally described, the following examples are given as particular embodiments of the invention and to demonstrate the practice and advantages thereof. It is understood that the examples are given by way of illustration and are not intended to limit the specification of the claims in any manner.

Example 1

The use of divalent metal salts as set retarders for a calcium aluminate cement was investigated. A slurry mixture of THERMALOCK cement was prepared according to the recommended procedure described for the preparation of oil field services in American Petroleum Institute (API) Recommended Practice 10B, 22$^{nd}$ Edition, December 1997. To the THERMALOCK solid blend was added the indicated amount of either citric acid, calcium chloride ($CaCl_2$), calcium nitrate $Ca(NO_3)_2$, magnesium chloride ($MgCl_2$) or a mixture of calcium chloride and citric acid. The thickening time of the slurry was measured at 220° F. by API recommended procedure described in the above reference and the results are shown in Tables 1-4. The amounts of the modifiers are given by the total weight of the cement blend. The % of modifier by weight of calcium aluminate component of the blend was obtained by dividing the given modifier weight % by 0.45 since the blend contains 45% calcium aluminate by weight of the cement composition.

TABLE 1

| | Wt. % citric acid | | |
|---|---|---|---|
| | 0 | 0.5 | 1 |
| Thickening time (min.) | 21 | 55 | 61 |

TABLE 2

| | Wt. % of $CaCl_2$ | | | | | | | | |
|---|---|---|---|---|---|---|---|---|---|
| | 0 | 0.25 | 0.35 | 0.4 | 0.45 | 0.5 | 0.55 | 0.6 | 0.7 | 1.0 |
| Thickening time | 21 min. | 36 min. | 32 min. | 35 min. | 38 min. | 44/53 min. | 15 hrs. | 19 hrs. | 15.4 hrs. | >21.5 hrs. |

TABLE 3

| | Wt. % of $Ca(NO_3)_2$ | | | |
|---|---|---|---|---|
| | 0 | 0.6 | 1.0 | 1.5 |
| Thickening time | 21 min. | 40 min. | 15 hrs. | >23 hrs. |

TABLE 4

| | Wt. % of $MgCl_2$ | | |
|---|---|---|---|
| | 0 | 0.2 | 0.6 |
| Thickening time | 21 min. | 32.5 min. | >16 hrs. |

The results demonstrate the ability of a polyvalent metal salt to significantly increase the thickening time of a calcium aluminate cement.

Example 2

A set modifier composition was prepared comprising citric acid and calcium chloride. The effect of the set modifier composition on the thickening time of a THERMALOCK slurry was investigated. Specifically, a THERMALOCK slurry was prepared as described in Example 1. To the slurry was added the indicated amount of set modifier composition and the thickening time determined as previously described. The results are shown in Table 5.

TABLE 5

| | Wt. % of $CaCl_2$/wt. % of citric | | | |
|---|---|---|---|---|
| | 0 | 0.5/0.25 | 0.5/0.5 | 1/1 |
| Thickening time | 21 min, | 72 min. | 60 min. | >18 hours |

The results demonstrate the thickening time of the slurry can be adjusted by varying the ratio of $CaCl_2$ to citric acid.

Example 3

The ability to vary the thickening times of a calcium aluminate cements using different combinations of organic acids, monovalent metal salts and polyvalent metal salts at high temperatures was investigated. Specifically, set modifier compositions comprising the organic acids: citric acid, tartaric acid and oxalic acid, were made with the polyvalent metal salts calcium chloride and CL-23 crosslinker, and the monovalent salts sodium chloride, sodium nitrate and lithium nitrate, each, when present, in the amounts indicated in Table 6. These set modifier compositions were added to THERMALOCK slurries that were prepared as described in Example 1 and the thickening time of these slurries at the indicated temperatures are also given in Table 6 while a plot of the thickening time as a function temperature for slurries containing the polyvalent metal salts calcium chloride and CL-23 are shown in FIG. 1.

TABLE 6

| Salt 1 | Salt 1 % bwo CAC | Salt 2 | Salt 2 % bwo CAC | Organic Acid 1 | Organic Acid 1 % bwo CAC | Organic Acid 2 | Organic Acid 2 % bwo CAC | Temp. (° F.) | Thickening Time Hours:minutes |
|---|---|---|---|---|---|---|---|---|---|
| CL-23 | 1.26 (Zr) | — | — | — | — | — | — | 220 | 4:30 |
| CL-23 | 1.8 (Zr) | — | — | — | — | — | — | 250 | 2:45 |
| CL-23 | 1.8 (Zr) | — | — | Citric | 2.1 | — | — | 250 | >29 hrs |
| CL-23 | 1.8 (Zr) | — | — | Tartaric | 2.1 | — | — | 250 | 22:00 |
| CL-23 | 1.8 (Zr) | — | — | Oxalic | 2.1 | — | — | 250 | 1:45 |
| CL-23 | 1.8 (Zr) | NaCl | 1.05 | — | — | — | — | 250 | 6:10 |
| CL-23 | 1.8 (Zr) | — | — | — | — | — | — | 300 | 1:50 |
| CL-23 | — | — | — | Citric | 3.15 | Tartaric | 3.15 | 300 | 17:15 |
| CL-23 | — | — | — | Citric | 4.2 | Tartaric | 4.2 | 300 | 0:15 |
| CaCl$_2$ | 1.26 | — | — | — | — | — | — | 250 | 9:30 |
| — | — | — | — | citric | 2.31 | Tartaric | 2.31 | 250 | 6:00 |
| CaCl$_2$ | 1.26 | — | — | — | — | — | — | 220 | 19:00 |
| CaCl$_2$ | 1.26 | NaCl | 0.63 | — | — | — | — | 220 | 6:00 |
| CaCl$_2$ | 1.26 | NaNO$_3$ | 0.63 | — | — | — | — | 220 | 1:20 |
| CaCl$_2$ | 1.26 | LiNO$_3$ | 0.63 | — | — | — | — | 220 | 2:40 |
| CaCl$_2$ | 1.26 | NaCl | 1.26 | — | — | — | — | 220 | 13:50 |
| CaCl$_2$ | 1.26 | — | — | — | — | — | — | 300 | 1:35 |

The results demonstrate the ability to adjust the thickening time of a calcium aluminate cement at high temperatures with a combination of organic acid, monovalent metal salts and polyvalent metal salts.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in contact with a subterranean formation, comprising:
    placing into a wellbore a composition comprising a calcium aluminate cement, flyash, and a set retarder consisting of a polyvalent metal salt, wherein the polyvalent metal salt comprises, a cobalt (II or III) salt, a nickel (II) salt, or combinations thereof, wherein the composition comprises at least 45 weight percent calcium aluminate cement, and wherein the calcium aluminate cement comprises from about 35% to about 80% by weight calcium aluminate; and
    allowing the composition to set, wherein the composition excludes Portland cement, and wherein the polyvalent metal salt is present in an amount of from about 0.3 wt. % to about 10 wt. % based on the calcium aluminate content of the calcium aluminate cement.

2. The method of claim 1 wherein the polyvalent metal salt further comprises calcium chloride, magnesium chloride, calcium nitrate or combinations thereof.

3. The method of claim 1 wherein the composition further comprises a monovalent metal salt.

4. The method of claim 3 wherein the monovalent metal salt comprises the soluble salts of sodium, lithium, potassium or combinations thereof.

5. The method of claim 1 wherein the composition sets at a temperature of from about 50° F. to about 350° F.

6. The method of claim 1 wherein the composition further comprises a phosphate salt.

7. The method of claim 6 wherein the phosphate salt comprises a polymeric alkali metal salt.

8. The method of claim 7 wherein the polymeric alkali metal salt comprises sodium metaphosphate.

9. The method of claim 1 wherein the flyash comprises Class F flyash.

10. The method of claim 1 wherein the composition sets at a temperature of greater than about 200° F.

11. The method of claim 1 wherein the composition has a thickening time of greater than about 1 hour at a temperature of greater than about 200° F.

12. The method of claim 1 wherein the polyvalent metal salt farther comprises calcium chloride, magnesium chloride, calcium nitrate or combinations thereof, and wherein the composition further comprises a monovalent metal salt.

13. The method of claim 1, wherein the polyvalent metal salt comprises cobalt (II or III) chloride, nickel (II) chloride, or combinations thereof.

14. A method of increasing the thickening time of a calcium aluminate cement comprising contacting the calcium aluminate cement comprising from about 35% to about 80% by weight calcium aluminate with flyash and a set retarder consisting of a polyvalent metal salt, wherein the polyvalent metal salt comprises, a cobalt (II or III) salt, a nickel (II) salt, or combinations thereof, wherein the composition comprises at least 45 weight percent calcium aluminate cement, wherein the composition excludes Portland cement, and wherein the polyvalent metal salt is present in an amount of from about 0.3 wt. % to about 10 wt. % based on the calcium aluminate content of the calcium aluminate cement.

15. The method of claim 14 wherein the polyvalent metal salt further comprises magnesium chloride, calcium nitrate, calcium chloride, or combinations thereof.

16. The method of claim 14 wherein the composition further comprises a phosphate salt.

17. The method of claim 16 wherein the phosphate salt comprises a polymeric alkali metal salt.

18. The method of claim 14 wherein the thickening time is greater than about 1 hour.

19. The method of claim 14, wherein the polyvalent metal salt comprises, cobalt (II or III) chloride, nickel (II) chloride, or combinations thereof.

20. A method of adjusting the thickening time of a calcium aluminate cement comprising contacting the calcium aluminate cement comprising from about 35% to about 80% by weight calcium aluminate with flyash, a set modifier comprising a set retarder consisting of a polyvalent metal salt, wherein the composition excludes Portland cement, and wherein the composition comprises at least 45 we percent calcium aluminate cement, wherein the polyvalent metal salt is present in an amount of from about 0.3 wt. % to about 10 wt. % based on the calcium aluminate content of the calcium aluminate cement, wherein the polyvalent metal salt comprises, a cobalt (II or III) salt, a nickel (II) salt, or combinations thereof.

21. The method of claim 20 wherein the set modifier further comprises a monovalent metal salt.

22. The method of claim 21 wherein the monovalent metal salt comprises the soluble salts of sodium, lithium, potassium or combinations thereof.

23. The method of claim 20, wherein the polyvalent metal salt comprises, cobalt (II or III) chloride, nickel (II) chloride, or combinations thereof.

24. A method of servicing a wellbore, comprising:
contacting a set retarder consisting of a polyvalent metal salt with water to form a first mixture, wherein the polyvalent metal salt comprises, a cobalt (II or III) salt, a nickel (II) salt, or combinations thereof;
contacting the first mixture with a calcium aluminate cement and flyash to form a slurry, wherein the slurry comprises at least 45 weight percent calcium aluminate cement, wherein the polyvalent metal salt is present in the slurry in an amount of from about 0.3 wt. % to about 10 wt. % based on the calcium aluminate content of the calcium aluminate cement, and wherein the calcium aluminate cement comprises from about 35% to about 80% by weight calcium aluminate;
placing the slurry into a wellbore; and
allowing the slurry to set.

25. The method of claim 24, wherein the polyvalent metal salt comprises cobalt (II or III) chloride, nickel (II) chloride, or combinations thereof.

\* \* \* \* \*

UNITED STATES PATENT AND TRADEMARK OFFICE
CERTIFICATE OF CORRECTION

PATENT NO. : 8,685,901 B2  
APPLICATION NO. : 11/669060  
DATED : April 1, 2014  
INVENTOR(S) : Ying Xu et al.

Page 1 of 1

It is certified that error appears in the above-identified patent and that said Letters Patent is hereby corrected as shown below:

In the Claims

In Column 11, Claim 20, line 28, replace "45 we percent" with --45 weight percent--.

Signed and Sealed this  
Tenth Day of June, 2014

Michelle K. Lee  
*Deputy Director of the United States Patent and Trademark Office*

UNITED STATES PATENT AND TRADEMARK OFFICE
CERTIFICATE OF CORRECTION

PATENT NO. : 8,685,901 B2
APPLICATION NO. : 11/669060
DATED : April 1, 2014
INVENTOR(S) : Xu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 622 days.

Signed and Sealed this
Thirtieth Day of May, 2017

Michelle K. Lee
*Director of the United States Patent and Trademark Office*